United States Patent [19]
McCleary et al.

[11] Patent Number: 5,463,804
[45] Date of Patent: Nov. 7, 1995

[54] COATING ALUMINUM ALLOY SHEET TO PROMOTE ADHESIVE BONDING FOR VEHICLE ASSEMBLIES

[75] Inventors: Sherri F. McCleary, Apollo; Gary A. Nitowski, Lower Burrell; James M. Marinelli, Murrysville; John T. Siemon, Cheswick, all of Pa.

[73] Assignee: Aluminum Company of America, Pittsburgh, Pa.

[21] Appl. No.: 299,055

[22] Filed: Aug. 31, 1994

[51] Int. Cl.⁶ .................................................. B21D 39/00
[52] U.S. Cl. ........................................ 29/469.5; 29/527.3
[58] Field of Search .............................. 29/469.5, 527.3, 29/527.2, 527.4, 527.6, 527.7; 156/292, 316

[56] References Cited

U.S. PATENT DOCUMENTS

| | | | |
|---|---|---|---|
| 3,220,832 | 11/1965 | Uhlig . | |
| 3,921,701 | 11/1975 | Cordone | 29/527.3 |
| 4,085,012 | 4/1978 | Marceau et al. | 156/151 |
| 4,308,079 | 12/1981 | Venables et al. | 148/6.5 R |
| 4,657,787 | 4/1987 | Singer et al. | 29/527.3 |
| 4,924,057 | 5/1990 | Puddle et al. . | |
| 5,026,612 | 6/1991 | Selwood et al. . | |
| 5,103,550 | 4/1992 | Wefers et al. | 29/527.4 |
| 5,106,429 | 4/1992 | McAuliffe et al. | 29/527.7 |
| 5,111,572 | 5/1992 | Haiml et al. | 29/469.5 |
| 5,132,181 | 7/1992 | Wefers et al. | 428/457 |
| 5,139,888 | 8/1992 | Selwood et al. . | |
| 5,154,462 | 10/1992 | Carpenter | 156/292 |
| 5,238,715 | 8/1993 | Wefers et al. | 428/34.4 |
| 5,288,356 | 2/1994 | Benefiel | 29/469.5 |
| 5,290,424 | 3/1994 | Mozelewski et al. | 205/116 |

*Primary Examiner*—Irene Cuda
*Assistant Examiner*—Marc W. Butler
*Attorney, Agent, or Firm*—Glenn E. Klepac

[57] ABSTRACT

Aluminum alloy sheet coated with an organophosphonic or organophosphinic acid is joined to an adjacent metal member by means of a polymeric adhesive, preferably an epoxy adhesive. The coated sheet may be worked into a desired configuration after coating. Assemblies made in accordance with the invention are useful as vehicle parts, including automotive body parts.

20 Claims, 3 Drawing Sheets

COATING ALUMINUM ALLOY SHEET TO PROMOTE ADHESIVE BONDING FOR VEHICLE ASSEMBLIES

FIELD OF THE INVENTION

The present invention relates to techniques for assembling aluminum alloy components into structures suitable for vehicular applications. More particularly, the invention covers coating aluminum alloy sheet with a phosphorus-containing organic compound to facilitate bonding the coated sheet to an adjacent metal member through a polymeric adhesive.

BACKGROUND OF THE INVENTION

The need to improve joint stiffness and to reduce cost and weight are critical to the efficient and effective use of aluminum in automotive and aircraft applications. Adhesive bonding as a method of joining is useful for accomplishing these objectives. However, achieving a durable adhesive bond often requires using an aluminum surface treatment. Traditional aluminum surface treatments designed for this purpose employ chromium-containing chemicals. Environmental concerns about chromium may soon render these surface treatments obsolete.

The present invention relates to a non-chromium "pretreated" aluminum sheet product. As used herein, the term "pretreated" refers to a surface treatment applied to an aluminum sheet before it is coiled for shipment to a user. A process for pretreating aluminum sheet utilizing a chromate solution is disclosed in Selwood et al U.S. Pat. No. 5,026,612.

The term "sheet" refers to aluminum alloy material having a thickness of about 0.006 to 0.249 inch. The term "plate" refers to aluminum alloy material having a thickness of 0.25 inch or more.

The primary criterion for selecting an aluminum pretreatment is adhesive bond durability. It is also imperative that the surface treatment not be detrimental to other downstream processes. For example, the surface treatment must not inhibit stamping and forming of the sheet. The surface treatment must remain intact during those operations. Resistance spot welding will be used in combination with adhesive bonding to improve performance in peel strength and in fixture components until the adhesive is cured. For that reason, it is important that the pretreatment not significantly reduce the quality of the welds or the life expectancy of the welding electrodes. It is also critical that the pretreatment not be detrimental to the painting process or to the chemical baths required for zinc phosphating and electrocoating before paint is applied.

A principal objective of the present invention is to provide a process for coating aluminum alloy sheet to provide durable adhesion to an adjacent component through a polymeric adhesive.

A related objective of the invention is to provide a non-chromate organic coating for aluminum alloy sheet that will not interfere with the quality of welds or reduce the life expectancy of metal welding electrodes.

Additional objectives and advantages of our invention will be readily apparent to persons skilled in the art from the following detailed description of a preferred embodiment.

Summary of the Invention

In accordance with the present invention, there is provided an aluminum alloy sheet. As used herein, the term "aluminum alloy" refers to an alloy containing about 85% or more aluminum and one or more alloying elements that are not subversive to organo-phosphorus surface coatings. Among such alloying elements are copper, manganese, magnesium, silicon, zinc and lithium. These alloying elements are sometime termed as character imparting for the reason that alloys containing them derive their characteristic properties from such elements.

Usually, the amounts of such alloying elements are, as to each of magnesium, copper and zinc, about 0.5 to 10% by weight of the total alloy; as to the element manganese, usually about 0.15 to 2% of the total alloy; as to silicon, usually about 0.2 to 1.5% of the total alloy; and, as to the element lithium, about 0.2 to 3% of the total alloy. Iron and beryllium may also be present in aluminum alloys and can have a marked effect upon alloys containing them. Iron, for example, is often adjusted in amounts of about 0.3 to 2.0% by weight to perform specific functions and beryllium may be present in amounts of about 0.001 to 5.0% of the total alloy.

Various aluminum alloys available in sheet form are suitable for practice of the present invention, including alloys belonging to the AA2000, 3000, 5000, 6000 and 7000 series. Alloys of the AA6000 series containing about 0.5 to 1.5 wt. % magnesium and about 0.3 to 1.5 wt. % silicon are preferred. This group of alloys includes AA alloy 6111 containing 0.5–1.0% Mg, 0.7–1.1% Si, 0.50–0.9% Cu and 0.15–0.45% Mn. Another useful group of alloys is the AA5000 series. One preferred example is AA alloy 5182 which contains 4.0–5.0 wt. % Mg and 0.20–0.50 wt. % Mn.

Aluminum alloy sheet material of the invention is coated with a phosphorus-containing organic acid, preferably an organophosphonic or organophosphinic acid. The organic acid is dissolved in a solvent such as water, ethanol, or other organic solvent, to form a solution which is coated onto the sheet by spraying, immersion or roll coating.

The term "organophosphonic acid" includes acids having the formula $R_m[PO(OH)_2]_n$ wherein R is an organic group containing 1–30 carbon atoms, m is the number of organic groups and is about 1–10, and n is the number of phosphonic acid groups and is about 1–10. Some suitable organophosphonic acids include vinyl phosphonic acid, methylphosphonic acid, ethylphosphonic acid, octylphosphonic acid and styrenephosphonic acid.

The term "organophosphinic acid" includes acids having the formula $R_m R'_o[PO(OH)]_n$ wherein R is an organic group containing 1–30 carbon atoms, R' is hydrogen or an organic group containing 1–30 carbon atoms, m is the number of R groups and is about 1–10, n is the number of phosphinic acid groups and is about 1–10, and o is the number of R' groups and is about 1–10. Some suitable organophosphinic acids include phenylphosphinic acid and bis-(perfluoroheptyl)phosphinic acid.

The process of the present invention does not require subjecting the aluminum alloy sheet to a treatment to form an aluminum hydroxide layer, as in Wefers et al U.S. Pat. No. 5,059,258. Accordingly, coated sheet of the invention consists essentially of the aluminum alloy sheet, an oxide layer adjacent the sheet and an organic surface coating overlying the oxide layer. The oxide layer has a thickness of less than about 200 angstroms, preferably less than about 100 angstroms, and is about 50 angstroms thick in a preferred example. A particularly preferred vinyl phosphonic acid coating is applied in essentially a monolayer. The coating weight is less than about 15 mg/m² and only about 3 mg/m² in a particularly preferred example.

An advantage of the present invention is that our organic surface coating contains less than about 1 wt. % chromium and preferably essentially no chromium. Accordingly, environmental concerns associated with prior art chromate conversion coatings are eliminated.

Coated aluminum alloy sheet material is cut in desired sizes and shapes and then worked into a predetermined configuration. Shaped assemblies made in accordance with the invention are suitable for many components of vehicles, including automotive bodies, doors, trunk decks and hood lids.

In manufacturing such automotive components, it is often necessary to join the coated sheet material to an adjacent metal member. Such metal members can be steel frames and extruded aluminum alloy structural members. Joining coated aluminum sheet to such metal members is usually accomplished in two steps. First, a polymeric adhesive layer is applied to the coated sheet and the coated sheet is pressed against the metal member.

The polymeric adhesive may be an epoxy, a polyurethane or an acrylic, with epoxies being particularly preferred.

After the adhesive is applied, the coated sheet and adjacent metal member are spot welded together, preferably in a joint area of applied adhesive. Spot welding increases peel strength of the assembly and facilitates handling during the time interval before the adhesive is completely cured. If desired, curing of the adhesive may be accelerated by heating the assembly to an elevated temperature.

The assembly is then passed through a zinc phosphate bath, dried, and painted or electrocoated with an appropriate finish.

DETAILED DESCRIPTION OF A PREFERRED EMBODIMENT

Figure 1:
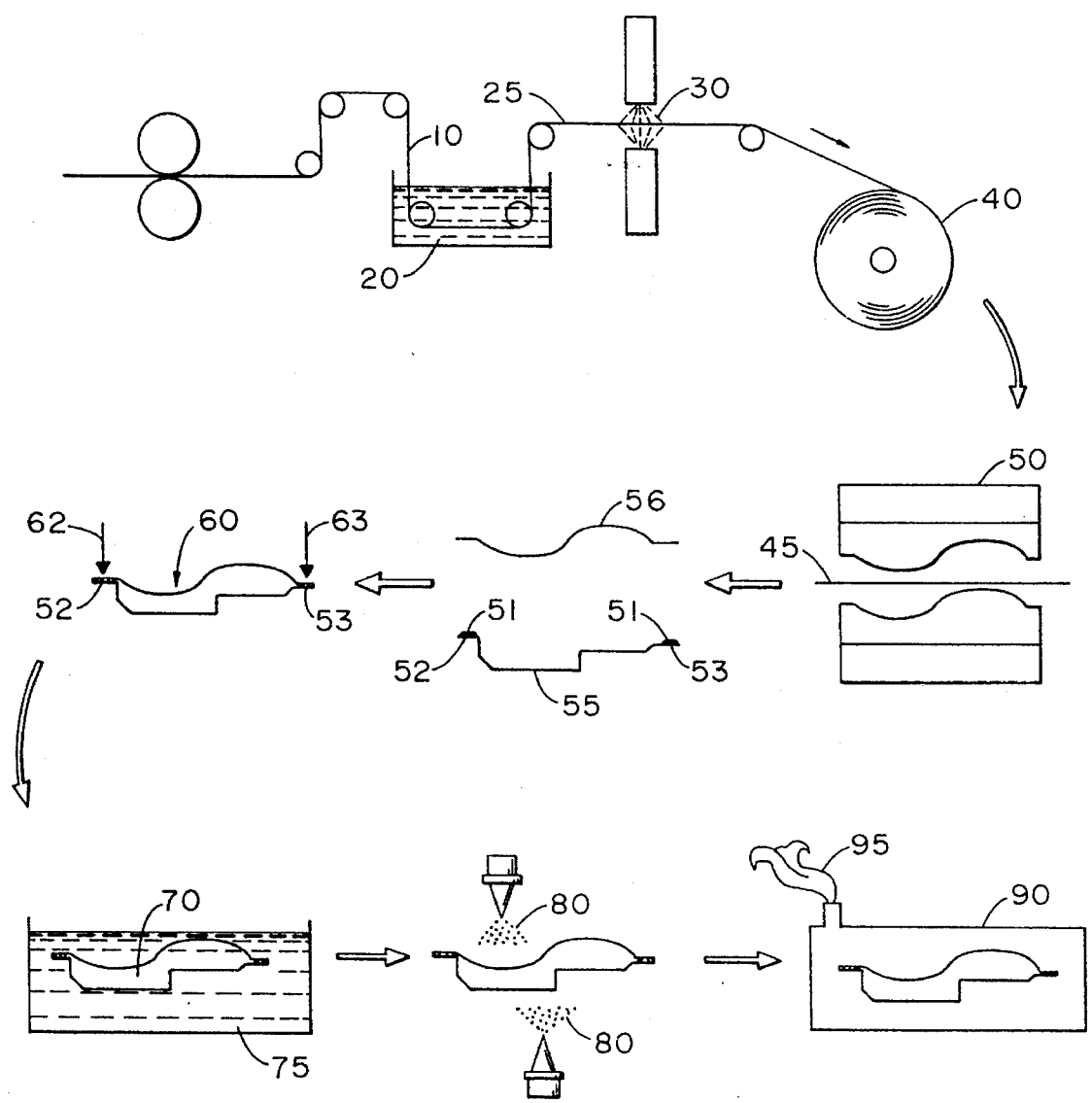
FIG. 1 is a schematic diagram of a process for joining aluminum alloy sheets in accordance with the present invention.

In FIG. 1, there is shown a schematic illustration of a process for adhesively joining an aluminum alloy sheet coated with an organophosphonic acid in accordance with the present invention.

The process starts with 6111-T4 aluminum alloy sheet 10 from a rolling mill (not shown) passing through an aqueous pretreatment bath 20 containing dissolved vinyl phosphonic acid. The coated sheet 25 may then be prelubricated with an organic lubricant 30 before being coiled into a sheet roll 40.

The treated sheet 25 is cut into measured lengths 45 which are worked into a desired configuration in a stamping press 50. An epoxy adhesive 51 is applied to spaced joint areas 52, 53 of a shape 55 which is then adhesively bonded to an adjacent aluminum alloy member 56.

The adhesively-joined assembly 60 is passed to a welding station where weld electrodes 62, 63 apply spot welds in joint areas 52, 53. The welded assembly 70 is coated with zinc phosphate in a bath 75; electrocoated or painted with a polymeric coating material 80; and cured in an oven 90 heated to an elevated temperature. Heating in the oven cures the adhesive joints and removes any organic solvent remaining from the adhesive or paint as an offgas 95.

A series of comparative tests has demonstrated the utility of our process for adhesively joining coated aluminum alloy sheet material into vehicle components. All results were generated using 6111-T4 aluminum alloy sheet coated with vinyl phosphonic acid and were compared with a chromate pretreatment, a commercially available zirconium conversion coating and a mill finish with no pretreatment. Test results are summarized below.

Adhesive Bond Durability

The adhesive used was Terokal 4520 from Teroson Automotive Products. This adhesive is a one-component toughened epoxy system. Adhesive thickness was controlled at 0.010 inch in each test. Lap shear specimens were cured by placing panels in a preheated press for 30 minutes at 177° C. (350° F.). Durability testing for this evaluation consisted of cyclic corrosion exposure of lap shear joint specimens under a constant applied load of 7 MPa (1,015 psi). The specimens were then exposed to the following 7-day cycle of atmospheric conditions:

1) 15 minutes immersion in salt water (5 wt. % NaCl solution).
2) 1 hour 45 minutes drip dry at ambient temperature.
3) 22 hours at 50° C. (122° F.) and 90% relative humidity.
4) After repeating steps 1–3 daily for 5 days, exposure to 90% relative humidity for 2 days at 50° C. (122° F.).

Figure 2:
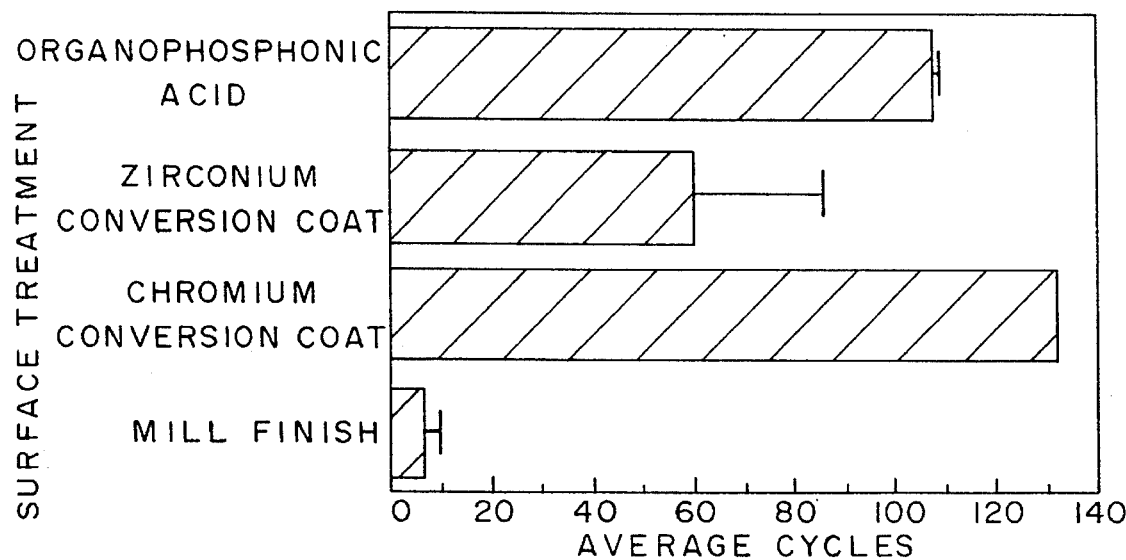
FIG. 2 is a bar graph of adhesive bond durability as a function of applied surface treatment.

The stressed specimens remained in this exposure regimen until catastrophic failure of the joints occurred. The results shown in FIG. 2 include the average number of cycles survived for 5 replicates (solid bar) and best result of the five tests (line). Both the specimens treated with vinyl phosphonic acid and the specimens given a chromate conversion coating were currently in test with no failures as of this writing.

Resistance Spot Welding

Figure 3:
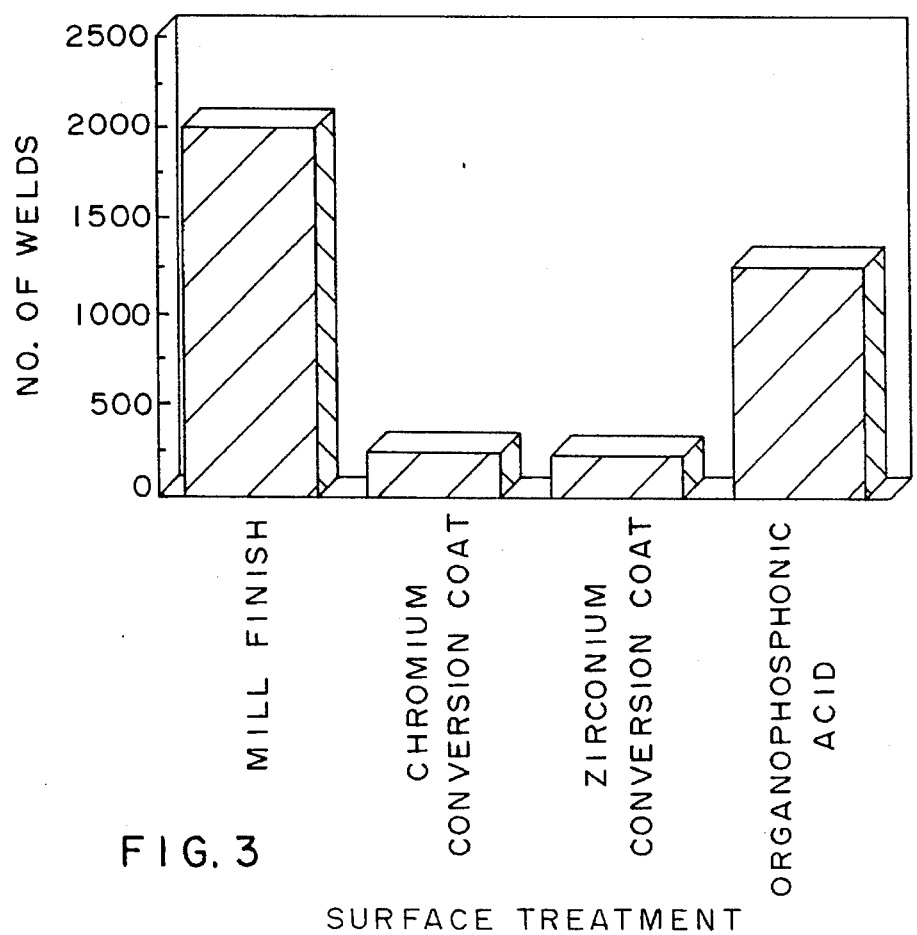
FIG. 3 is a bar graph of welding electrode life as a function of applied surface treatment.
Figure 4:
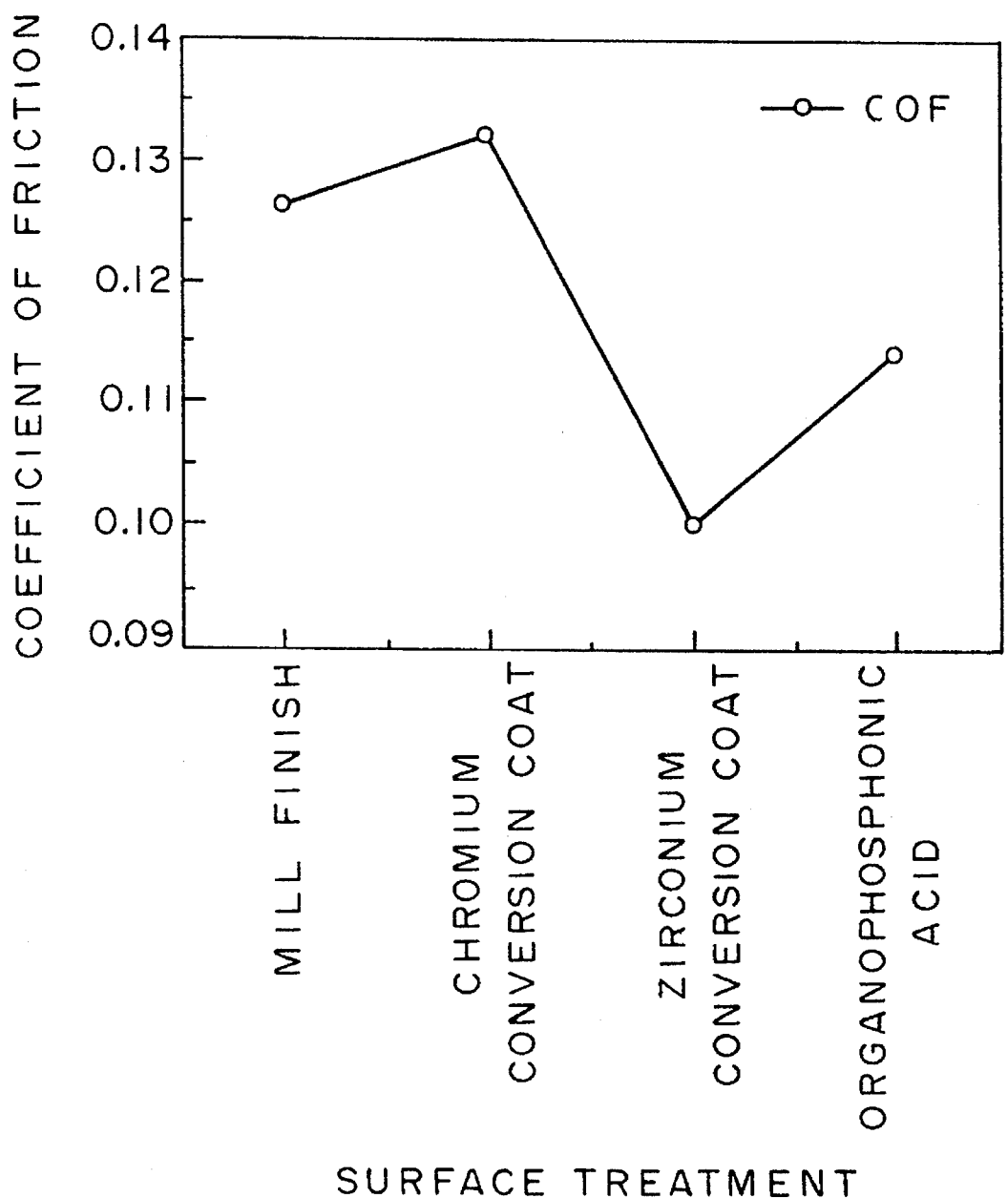
FIG. 4 is a graph showing coefficient of friction as a function of applied surface treatment.

In evaluating spot welding of aluminum, an important measure of performance is the life of welding electrodes. When the quality and average size of weld nuggets deteriorates to a certain point (according to Aluminum Association guidelines), the electrodes are removed from the welding equipment and replaced or redressed. Electrode life is thus defined by the number of acceptable welds made with an electrode set without electrode dressing and without changes in the welding parameters. Automotive manufacturers currently have a life target of 2,000 welds per electrode set when welding mill finish (uncoated) aluminum. Results of the electrode life test are shown in FIG. 3. Although the test with a vinyl phosphonic acid coating did not meet the 2,000-weld target, it did result in a smaller drop in performance than the other surface treatments which were evaluated.

Metal Forming

Metal formability was characterized by a limiting dome height (LDH) test and by measuring coefficient of friction (COF) through a draw bead simulator test. The LDH test measures formability of a material in plane strain by deforming the sheet over a dome-shaped tool of varying depth or height. All specimens performed comparably, within limits of test error, on the LDH test. LDH specimens were also examined for signs of cracking or removal of the surface coatings. There was no evidence of either defect on the surface treated specimens.

Results of the coefficient of friction test shown in FIG. 3 demonstrate better performance for the vinyl phosphonic acid treated specimens than for a mill finish or a chromium conversion coating.

Painting

In testing painted surface performance, aluminum panels with each surface treatment were primed and painted with factory-grade paints. A small line was scribed through the paint to expose the metal surface, and the panels were then exposed to the same cyclic corrosion test described above for adhesive bond durability. After exposure, the panels were examined for blistering and signs of undermining corrosion along the scribe lines. The mill finish, chromium conversion coating and vinyl phosphonic acid specimens all passed this test, but the zirconium conversion coating failed.

The foregoing detailed description of our invention has been made with reference to some preferred embodiments. Persons skilled in the art will understand that numerous changes and modifications can be made therein without departing from the spirit and scope of the following claims:

What is claimed is:

1. A process for making an assembly comprising an aluminum alloy sheet joined to a metal member adjacent said sheet, comprising:

(a) coating an aluminum alloy sheet with a phosphorus-containing organic acid selected from the group consisting of organophosphonic acids and organophosphinic acids, thereby to form a coated sheet having an organic, non-chromate surface coating thereon;

(b) applying a polymeric adhesive to the coated sheet; and (c) joining said coated sheet to an adjacent metal member through said polymeric adhesive.

2. The process in accordance with claim 1 further comprising:

(d) working said coated sheet into a desired configuration after step (a) and before step (b).

3. The process in accordance with claim 1 further comprising:

(d') welding said coated sheet to said adjacent metal member.

4. The process in accordance with claim 1 further comprising:

(d") painting said coated sheet.

5. The process in accordance with claim 1 wherein the coated sheet of step (a) consists essentially of said aluminum alloy sheet, an oxide layer having a thickness of less than about 200 angstroms adjacent said sheet and an organic surface coating overlying said oxide layer.

6. The process in accordance with claim 5 wherein said surface coating comprises essentially a monolayer of said organic acid.

7. The process in accordance with claim 1 wherein said surface coating has a coating weight of less than about 15 mg/m$^2$.

8. The process in accordance with claim 1 wherein said phosphorus-containing organic acid is selected from the group consisting of:

(i) organophosphonic acids having the formula $R_m[PO(OH)_2]_n$ wherein R is an organic group containing 1–30 carbon atoms, m is the number of organic groups and is about 1–10, and n is the number of phosphonic acid groups and is about 1–10;

(ii) organophosphinic acids having the formula $R_m R'_o [PO(OH)]_n$ wherein R is defined above, R' is hydrogen or an organic group containing 1–30 carbon atoms, m is the number of R groups, n is the number of phosphinic acid groups and o is the number of R' groups in the molecule; and (iii) mixtures of said organophosphonic and organophosphinic acids.

9. The process in accordance with claim 1 wherein said organic acid comprises vinyl phosphonic acid.

10. The process in accordance with claim 1 wherein said polymeric adhesive is selected from the group consisting of epoxy, polyurethane and acrylic adhesives.

11. The process in accordance with claim 1 wherein said metal member comprises steel or an aluminum alloy.

12. The process in accordance with claim 1 wherein said surface coating contains less than about 1 wt. % chromium.

13. The process in accordance with claim 1 wherein said surface coating contains essentially no chromium.

14. The process of claim 1 wherein said automotive assembly is selected from the group consisting of automotive bodies, doors, trunk decks and hood lids.

15. The process of claim 1 wherein said aluminum alloy sheet includes an oxide layer having a thickness of less than about 100 angstroms.

16. The process of claim 1 wherein said aluminum alloy sheet includes an oxide layer having a thickness of about 50 angstroms.

17. A process for making a welded automotive assembly comprising the steps of:

(a) coating an aluminum alloy sheet with an organophosphonic or organophosphinic acid to form a coated sheet having an organic surface coating containing less than about 1 wt. % chromium;

(b) cutting and working said sheet into a desired configuration;

(c) applying an epoxy adhesive to a joint area of the coated sheet;

(d) joining said joint area of the coated sheet to an adjacent metal member comprising steel or an aluminum alloy, thereby to form an automotive assembly;

(e) welding said coated sheet to said metal member in said joint area; and (f) curing said epoxy adhesive.

18. The process of claim 17 wherein said organic acid comprises vinyl phosphonic acid.

19. The process of claim 17 wherein said automotive assembly is selected from the group consisting of automotive bodies, doors, trunk decks and hood lids.

20. The process of claim 17 wherein said aluminum alloy sheet includes an oxide layer having a thickness of less than about 100 angstroms.

* * * * *